United States Patent
Nomoto et al.

(10) Patent No.: US 10,909,353 B2
(45) Date of Patent: Feb. 2, 2021

(54) INFORMATION PROCESSING APPARATUS, INFORMATION PROCESSING METHOD, NON-TRANSITORY COMPUTER-READABLE STORAGE MEDIUM

(71) Applicant: CANON KABUSHIKI KAISHA, Tokyo (JP)

(72) Inventors: Atsuo Nomoto, Tokyo (JP); Koji Ueno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 125 days.

(21) Appl. No.: 16/379,882

(22) Filed: Apr. 10, 2019

(65) Prior Publication Data
US 2019/0318157 A1    Oct. 17, 2019

(30) Foreign Application Priority Data

Apr. 13, 2018    (JP) ................... 2018-077796

(51) Int. Cl.
*G06K 9/00*   (2006.01)
*G06T 7/33*   (2017.01)
*G06K 9/62*   (2006.01)

(52) U.S. Cl.
CPC ..... *G06K 9/00281* (2013.01); *G06K 9/00288* (2013.01); *G06K 9/6228* (2013.01); *G06T 7/33* (2017.01); *G06T 2200/04* (2013.01); *G06T 2207/30201* (2013.01)

(58) Field of Classification Search
None
See application file for complete search history.

(56) References Cited

U.S. PATENT DOCUMENTS

| 5,577,135 A | * | 11/1996 | Grajski | G06K 9/00422 |
| | | | | 382/187 |
| 6,408,107 B1 | * | 6/2002 | Miller | G06K 9/6206 |
| | | | | 382/151 |
| 7,634,137 B2 | | 12/2009 | Simard et al. | |

(Continued)

FOREIGN PATENT DOCUMENTS

| JP | 2009008446 A | * | 1/2009 |
| JP | 2009211177 A | | 9/2009 |

OTHER PUBLICATIONS

Viola et al. "Robust Real-Time Face Detection." International Journal of Computer Vision. vol. 57, Issue 2. 2004: 137-154.

(Continued)

*Primary Examiner* — Jiangeng Sun
(74) *Attorney, Agent, or Firm* — Rossi, Kimms & McDowell LLP

(57) ABSTRACT

An information processing apparatus comprises a conversion unit configured to convert an element array, in each region set so as to partially overlap at least one set of adjacent regions in input data, into a lower dimension element array of which dimension is lower than that of the element array; a generation unit configured to generate a connected element by connecting some or all of the lower dimension element arrays converted by the conversion unit so that an overlapping portion in each of the lower dimension element arrays will be shared; and a calculation unit configured to obtain a feature amount of the input data based on convolution of the connected elements and a weight coefficient.

20 Claims, 10 Drawing Sheets

(56) References Cited

U.S. PATENT DOCUMENTS

| | | |
|---|---|---|
| 8,160,388 B2 | 4/2012 | El-Mahdy et al. |
| 8,971,589 B2 | 3/2015 | Kato et al. |
| 10,067,669 B1* | 9/2018 | Mahmoud .............. G06K 9/344 |

OTHER PUBLICATIONS

Sermanet et al. "Convolutional Neural Networks Applied to House Numbers Digit Classification." International Conference on Pattern Recognition. 2012: 1-4.
Tran et al. "Learning Spatiotemporal Features with 3D Convolutional Networks." International Conference on Computer Vision. 2015: 4489-4497.

* cited by examiner

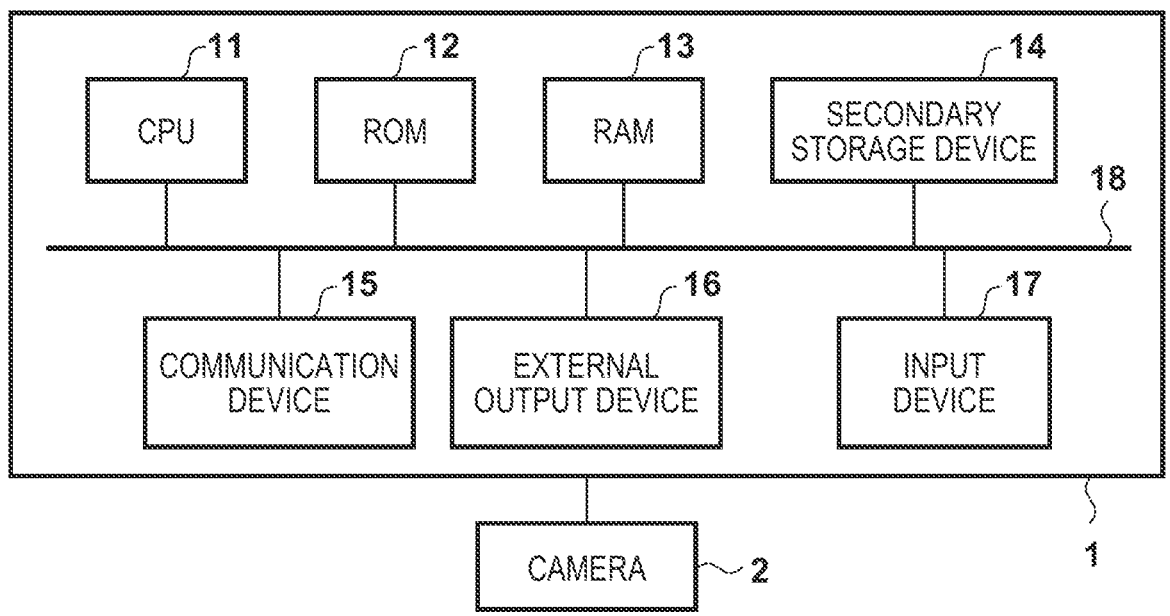
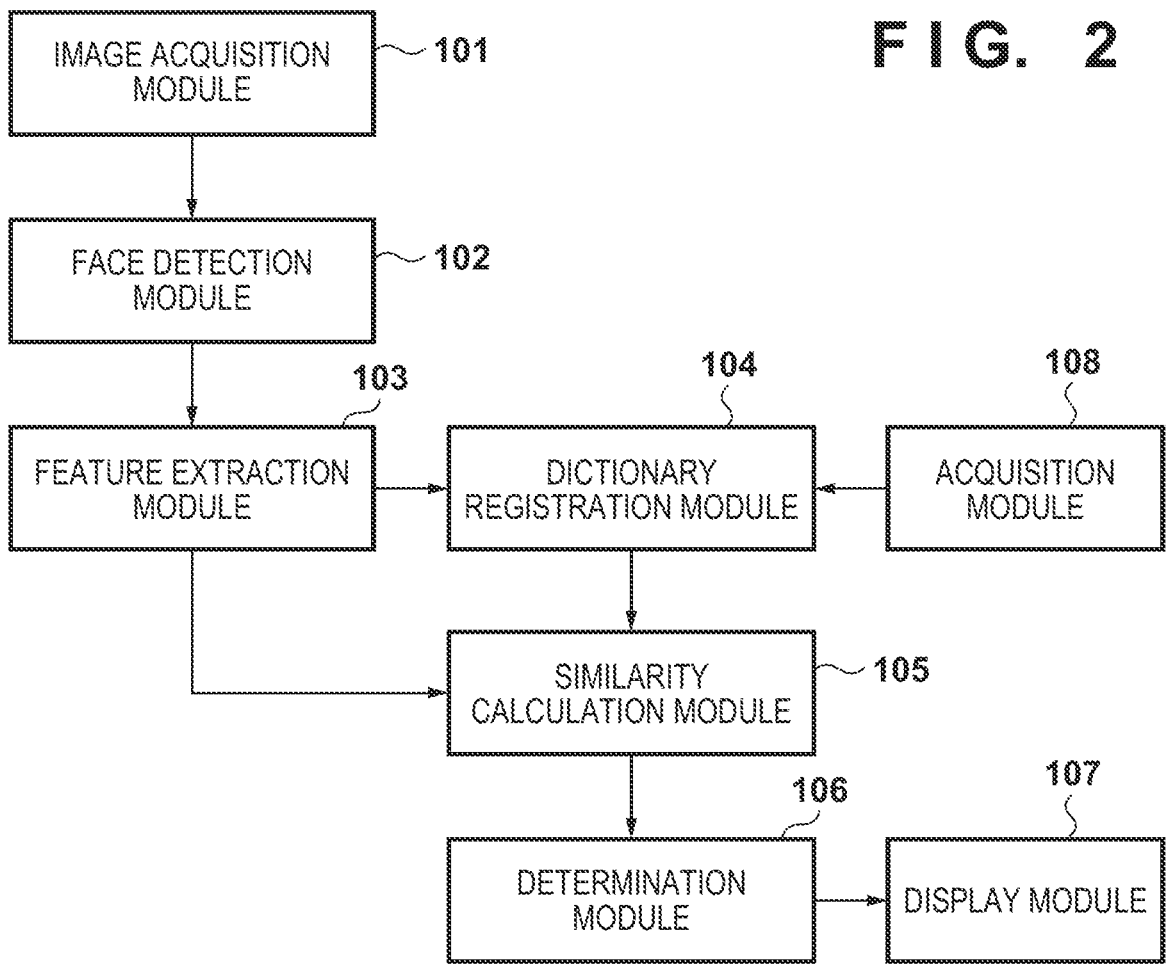

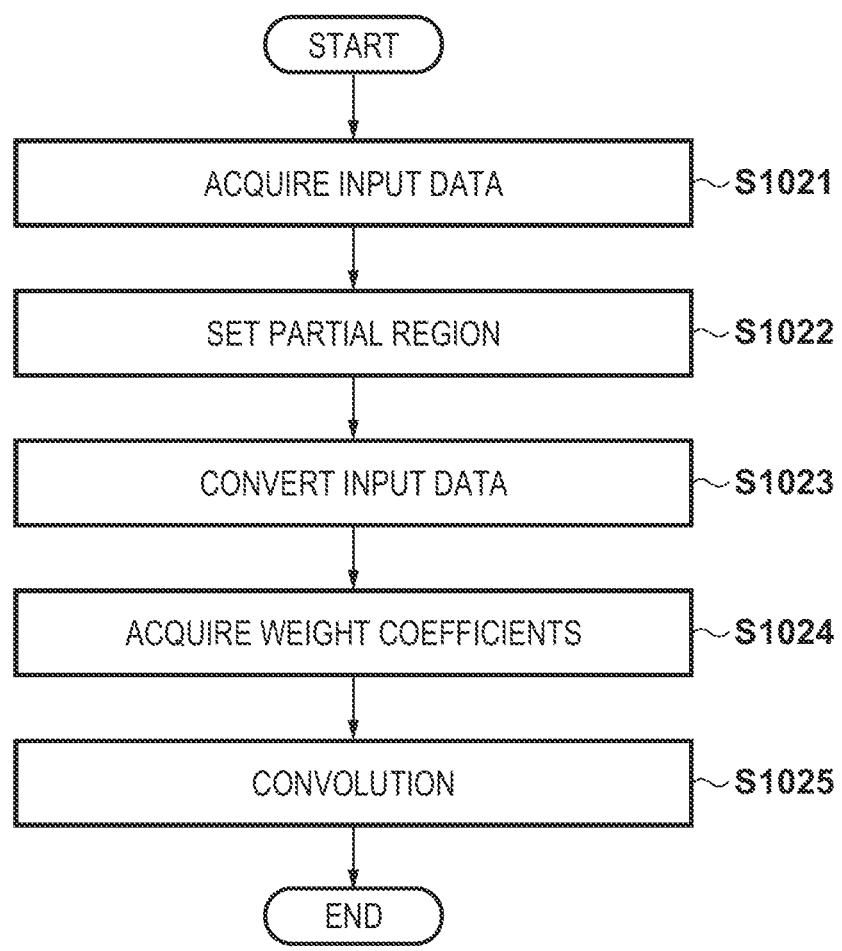

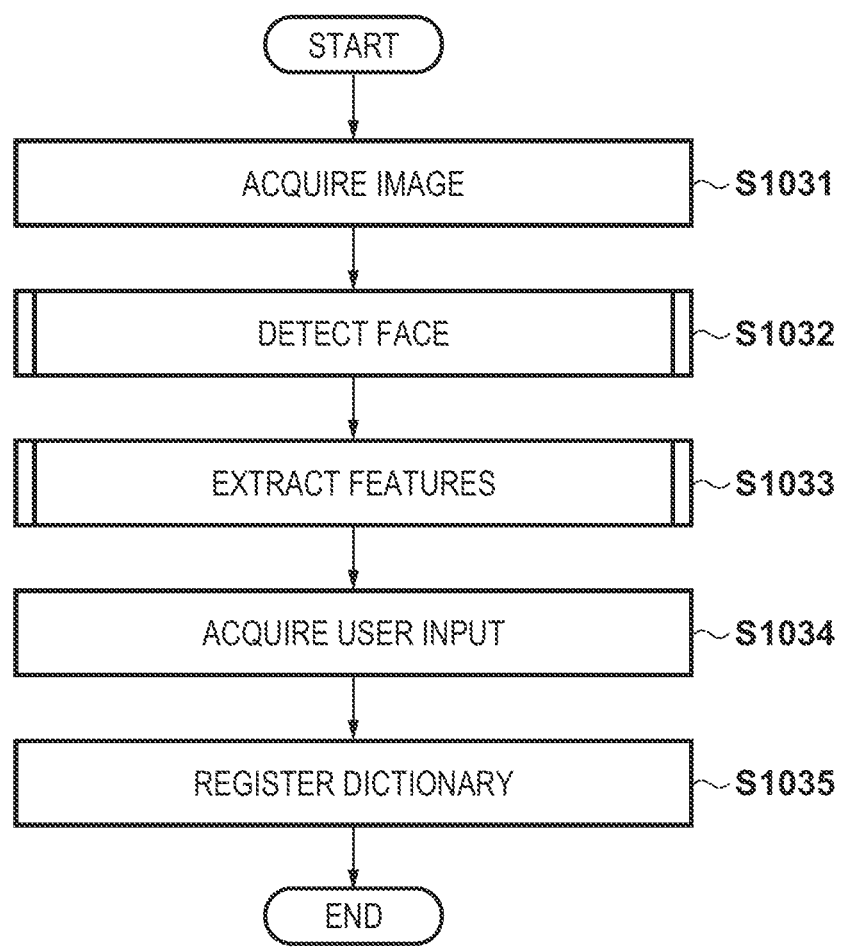

INFORMATION PROCESSING APPARATUS, INFORMATION PROCESSING METHOD, NON-TRANSITORY COMPUTER-READABLE STORAGE MEDIUM

BACKGROUND OF THE INVENTION

Field of the Invention

The present invention relates to an information processing technique using convolution.

Description of the Related Art

In recent years, an image recognition technique using a convolutional neural network (CNN) has gained attention. It is known that training a CNN by using a large amount of images will allow the CNN to achieve high recognition accuracy, and this technique has been used and applied to various kinds of fields.

When a trained CNN is to actually operate and is to be used as some kind of a processing system, its execution speed is important. For example, real-time processing would be required if authentication of a person who has been captured by a monitoring camera is to be performed, and a result would need to be returned within a length of time that would not degrade user convenience if a specific image is to be searched from previously captured and stored images.

In general, image convolution takes up a large part of a CNN operation, and the speedup of convolution is necessary to increase the speed of the CNN operation. Although a method of increasing the operation speed by approximation calculation can be employed, since this method can influence the recognition accuracy, it is more desirable to increase the operation speed by a method that will not change the arithmetic operation result.

The specification of U.S. Pat. No. 8,160,388 discloses, in a case in which a specific filter is to be used in image convolution, a method of reducing the operation count when the filter is to be applied by separating the filter in a vertical direction and a horizontal direction and executing the operation separately. According to this method, although applicable filters are limited, the speedup of the operation can be expected since the operation count itself will be reduced.

The specification of U.S. Pat. No. 7,634,137 discloses a method of generating a transformation matrix in which a partial region of a filter application target image is rearranged to have the same arrangement as the filter so as to result in a matrix product with the filter matrix. The arithmetic operation tends to be hindered by discontinuous access to a partial region of the image. This method can perform a high-speed arithmetic operation since a continuous memory access to an element becomes possible at the time of a sum product operation by resulting in a matrix product.

However, these methods are insufficient in the point of view of speedup. In the method disclosed in the specification of U.S. Pat. No. 8,160,388, since two convolutions need to be executed sequentially in separate vertical and horizontal directions, the access to the image will increase compared to that in a normal two-dimensional convolution, and the processing speed may degrade as a result. In the method disclosed in the specification of U.S. Pat. No. 7,634,137, the total memory access amount increases since rearrangement is performed redundantly by allowing the pixel values of the image to overlap, and the processing speed may degrade as a result.

In particular, the arithmetic operational performance of a GPU (Graphic Processing Unit) is higher than that of a CPU (Central Processing Unit). Hence, memory access can hinder the processing speed when an arithmetic operation is to be performed by using a GPU, and pose problem for speedup.

SUMMARY OF THE INVENTION

The present invention provides a technique for executing convolution processing on input data at a speed higher than that of a related art.

According to the first aspect of the present invention, there is provided an information processing apparatus comprising: a conversion unit configured to convert an element array, in each region set so as to partially overlap at least one set of adjacent regions in input data, into a lower dimension element array of which dimension is lower than that of the element array; a generation unit configured to generate a connected element by connecting some or all of the lower dimension element arrays converted by the conversion unit so that an overlapping portion in each of the lower dimension element arrays will be shared; and a calculation unit configured to obtain a feature amount of the input data based on convolution of the connected elements and a weight coefficient.

According to the second aspect of the present invention, there is provided an information processing method performed by an information processing apparatus, the method comprising: converting an element array, in each region set so as to partially overlap at least one set of adjacent regions in input data, into a lower dimension element array of which dimension is lower than that of the element array; generating a connected element by connecting some or all of the lower dimension element arrays converted in the converting so that an overlapping portion in each of the lower dimension element arrays will be shared; and obtaining a feature amount of the input data based on convolution of the connected elements and a weight coefficient.

According to the third aspect of the present invention, there is provided a non-transitory computer-readable storage medium storing a computer program for causing a computer to function as a conversion unit configured to convert an element array, in each region set so as to partially overlap at least one set of adjacent regions in input data, into a lower dimension element array of which dimension is lower than that of the element array of a lower dimension; a generation unit configured to generate a connected element by connecting some or all of the lower dimension element arrays converted by the conversion unit so that an overlapping portion in each of the lower dimension element arrays will be shared; and a calculation unit configured to obtain a feature amount of the input data based on convolution of the connected elements and a weight coefficient.

Further features of the present invention will become apparent from the following description of exemplary embodiments (with reference to the attached drawings).

BRIEF DESCRIPTION OF THE DRAWINGS

FIG. 1 is a block diagram showing an example of the arrangement of a system;

FIG. 2 is a block diagram showing an example of the functional arrangement of an information processing apparatus 1;

FIG. 6 is a flowchart of convolution processing;

FIG. 9 is a flowchart corresponding to a registration function;

DESCRIPTION OF THE EMBODIMENTS

Figure 3:
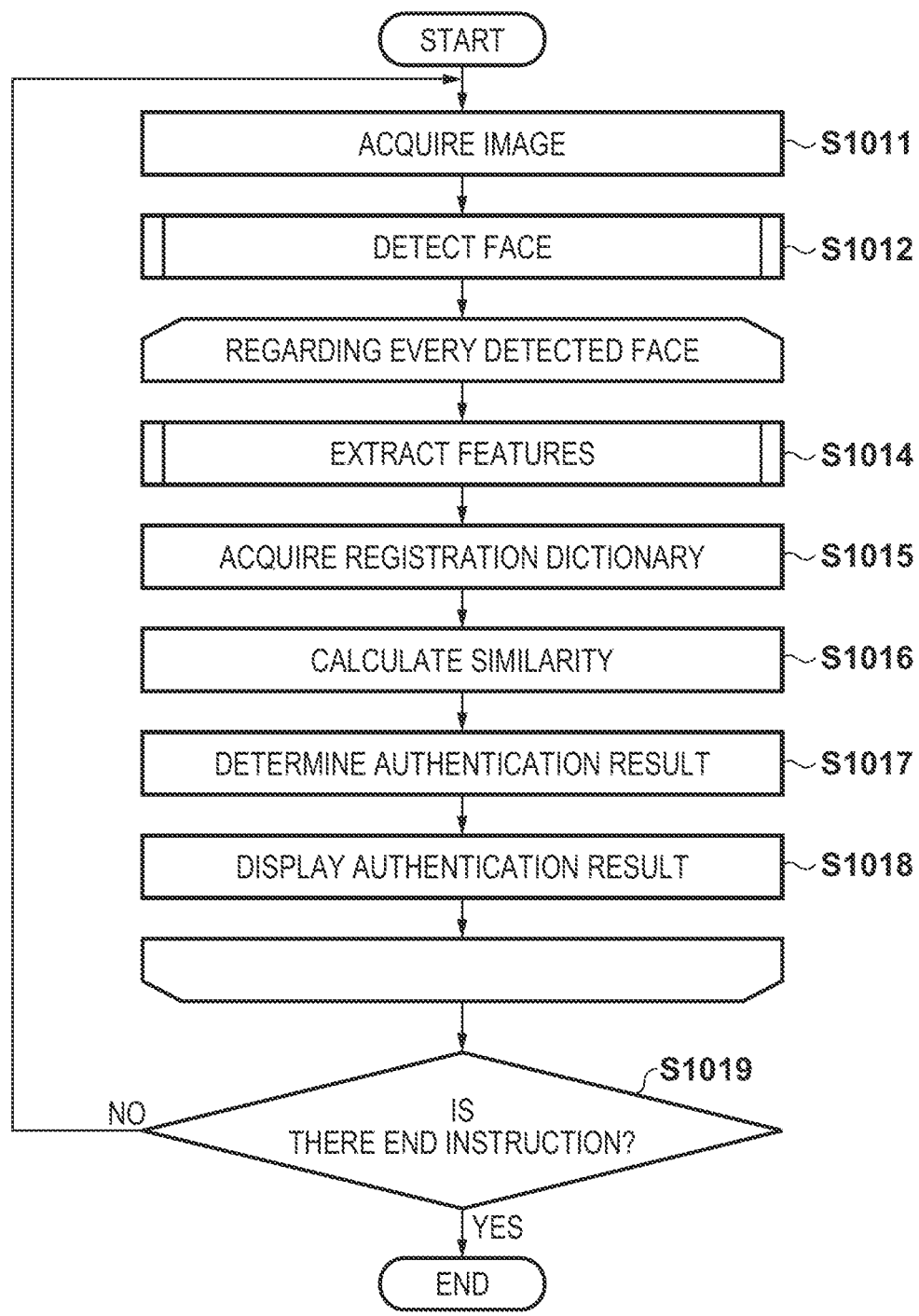
FIG. 3 is a flowchart corresponding to an authentication function.

Embodiments of the present invention will now be described with reference to the accompanying drawings. Note that the embodiments to be described below are examples of detailed implementation of the present invention or detailed examples of the arrangement described in the appended claims.

First Embodiment

An example of the arrangement of a system according to this embodiment will be described first with reference to the block diagram of FIG. 1. As shown in FIG. 1, the system according to this embodiment includes an information processing apparatus 1 and a camera 2, and the information processing apparatus 1 and the camera 2 are arranged so as to be able to execute data communication with each other via a network. The network may be a wireless network, a wired network, or a network combining the wireless network and the wired network.

The camera 2 will be described first. The camera 2 is a network camera (image capturing device) capable of capturing moving images and still images, and includes a camera unit which includes a lens and an image sensor such as a CCD, a CMOS sensor or the like and a communication device for executing data communication with the information processing apparatus 1 by connecting to the above-described network. Note that another kind of camera that has a communication function may be used as the camera 2. When a moving image is captured by the camera 2, each frame image of the moving image is output (transmitted) as a captured image to the information processing apparatus 1. On the other hand, when a still image is captured by the camera 2, the still image is output (transmitted) as a captured image to the information processing apparatus 1. Note that the camera 2 may be an image capturing device configured to capture visible light or an infrared light camera configured to capture infrared light.

The information processing apparatus 1 will be described next. The information processing apparatus 1 is a computer device such as a PC (personal computer), a tablet terminal device, a smartphone, or the like. A CPU 11 executes processing by using computer programs and data stored in a ROM 12 and a RAM 13. This allows the CPU 11 to control the overall operation of the information processing apparatus 1 and control or execute each processing operation to be described later as that to be performed by the information processing apparatus 1.

The ROM 12 is a nonvolatile memory and holds an activation program and various kinds of setting data of the information processing apparatus 1. The RAM 13 is a volatile memory, and includes an area for storing computer programs and data loaded from a secondary storage device 14 and the ROM 12 and data (for example, an image captured by the camera 2) received from the outside (for example, the camera 2) via a communication device 15. The RAM 13 also includes a work area which is used by the CPU 11 to execute various kinds of processing. In this manner, the RAM 13 suitably provides various kinds of areas.

The secondary storage device 14 is a large-capacity information storage device represented by a hard disk drive device. The secondary storage device 14 stores an OS (operating system) and the computer programs and data for allowing the CPU 11 to execute or control each of the processing operations to be described later as those to be performed by the information processing apparatus 1. The data stored in the secondary storage device 14 includes data to be described later as known information. The computer programs and data stored in the secondary storage device 14 are appropriately loaded to the RAM 13 in accordance with the control of the CPU 11 and become targets of processing by the CPU 11.

The communication device 15 is a device for the information processing apparatus 1 to execute data communication with an external apparatus, and for example, the communication device 15 can receive a captured image from the camera 2 by executing data communication with the camera 2.

An external output device 16 is a display device such as a liquid crystal screen, and can display the processing results of the CPU 11 by using images and characters. In this embodiment, the external output device 16 will use images, characters, and the like to display an authentication result of a captured image obtained by the camera 2. Note that the external output device 16 may be a loudspeaker configured to output audio based on an audio signal, and in such a case, the external output device 16 can output the above-described authentication result as audio. In addition, the external output device 16 may also be an LED lamp, and in such a case, the external output device 16 will be able to notify a user of the above-described authentication result by lighting an LED lamp or a lighting pattern by an LED lamp. In this manner, in the case of this embodiment, the external output device 16 may be any device as long as it is a device capable of notifying the user of the above-described authentication result.

An input device 17 is formed by user interfaces such as a keyboard and a mouse, and the user can operate the input device to input various kinds of instructions in the CPU 11. Note that a touch panel screen may be arranged by integrating the input device 17 and the display device.

The CPU 11, the ROM 12, the RAM 13, the secondary storage device 14, the communication device 15, the external output device 16, and the input device 17 are all connected to a bus 18. Note that the arrangement of the information processing apparatus 1 shown in FIG. 1 is merely an example, and for example, the information processing apparatus 1 may include an interface for attaching/detaching a rewritable memory device such as a flash memory or the like.

The information processing apparatus 1 has an authentication function to authenticate who the object in the image captured by the camera 2 is by using a registration dictionary that has been registered in advance and a registration function to create and register a registration dictionary from the image captured by the camera 2. In order to determine whether the authentication function is to be operated or the registration function is to be operated, for example, it may be arranged so that the user can operate the input device 17 to instruct which of the authentication function and the registration function is to be executed, and the CPU 11 can execute one of the authentication function and the registration function in accordance with the instruction.

An example of the functional arrangement of the information processing apparatus 1 will be shown in the block diagram of FIG. 2. Although each functional module shown in FIG. 2 may be described as the main body of processing hereinafter, a function corresponding to each functional module is executed by causing the CPU 11 to execute a computer program to cause the CPU 11 to implement the function corresponding to the functional module in practice. FIG. 3 shows a flowchart corresponding to the authentication function. The operation of each functional module shown in FIG. 2 will be described hereinafter in accordance with the flowchart of FIG. 3. Note that the information processing apparatus 1 has been activated before the start of the processing according to the flowchart of FIG. 3 and is in a state capable of starting the processing to be described. In addition, the camera 2 also has been activated, and is in a moving image capturing state as a monitoring camera.

In step S1011, an image acquisition module 101 acquires a captured image received by the communication device 15 from the camera 2 and stored in the RAM 13, and converts the captured image into a single-channel grayscale image. Note that it may be arranged so that the captured image will be converted into a single-channel grayscale image when the captured image is to be stored in the RAM 13 or may be arranged so that the camera 2 will capture a single-channel grayscale image.

In step S1012, a face detection module 102 detects a region of an object (the face of a person in this embodiment) from the captured image acquired by the image acquisition module 101 and extracts an image, as a face image, from the detected region. A known technique can be used as the method for detecting a person's face from an image. For example, a technique described in the following literature can be used.

VIOLA et al. "Robust Real-Time Face Detection." International Journal of Computer Vision. Vol. 57, Issue 2. 2004: 137-154.

The face image is cut out from the captured image based on the coordinates of the face image detected from the captured image. In this case, image normalization is performed on the face image so that the position of the face with respect to the face image that has been cut out will be constant. For example, scaling is performed so that the length of a line connecting the eyes of the face will be constant with respect to the face image to be cut out. Processing such as rotating the line so it will be horizontal with respect to the face image to be cut out will be performed. Subsequently, the following processes of steps S1014 to step S1018 will be performed for each face image detected from the captured image.

In step S1014, a feature extraction module 103 uses a pre-generated CNN to extract a feature amount from each face image. An example of the functional arrangement of the feature extraction module 103 will be described by using the block diagram of FIG. 4.

Figure 5:
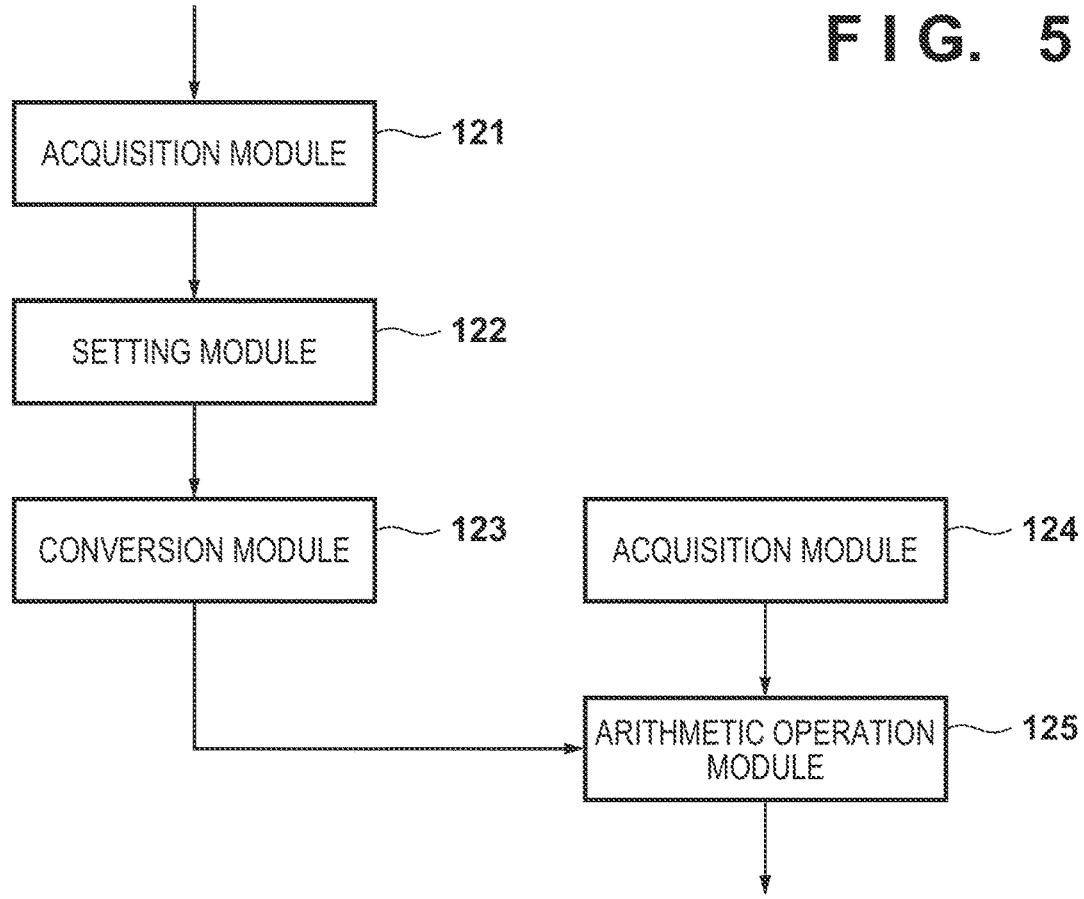
FIG. 5 is a block diagram showing an example of the functional arrangement of a convolution processing module 111.

A convolution processing module 111 performs convolution processing on a face image. An example of the functional arrangement of the convolution processing module 111 is shown in the block diagram of FIG. 5. The convolution processing performed by the convolution processing module 111 on a face image will be described in accordance with the flowchart of FIG. 6.

In step S1021, an acquisition module 121 acquires a face image as input data. In this embodiment, a face image is a single-channel grayscale image. In step S1022, a setting module 122 sets a two-dimensional setting region on (on a two-dimensional image) a face image (face image acquired by the acquisition module 121) so that adjacent setting regions (partial regions) will partially overlap each other. Although the size of the setting region will be 3 (pixels)×3 (pixels) in this embodiment, the size of the setting region is not limited to this size. The setting module 122 sets, for example, a setting region on each pixel position in the face image so that the top left corner of the setting region will be positioned at the pixel position. As a result, a plurality of setting regions can be set so that adjacent setting regions will partially overlap each other. In this embodiment, since the size of each setting region is 3 (pixels)×3 (pixels) and the setting regions are set at the respective pixel positions on the face image, adjacent setting regions will include overlapping portions.

Figure 7A:
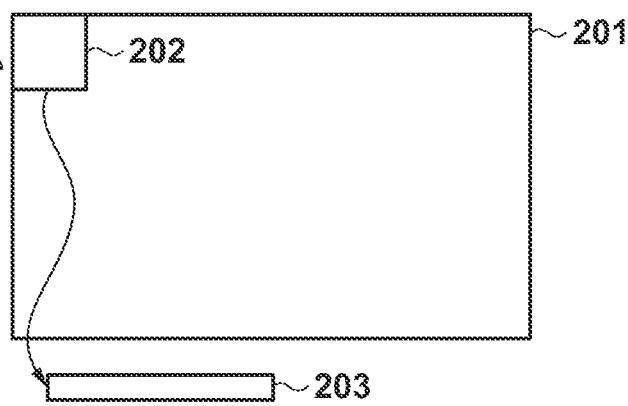
FIGS. 7A to 7C are schematic views showing a connected one-dimensional pixel array generation processing performed by a conversion module 123.
Figure 7B:
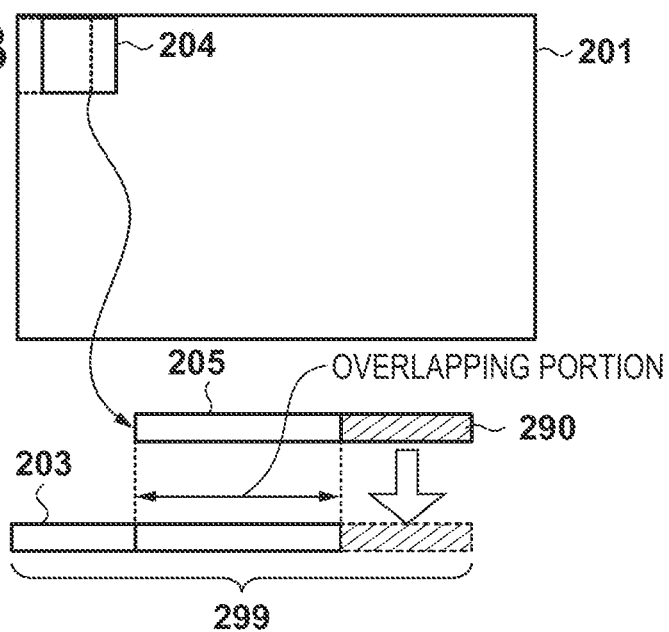
Figure 7C:
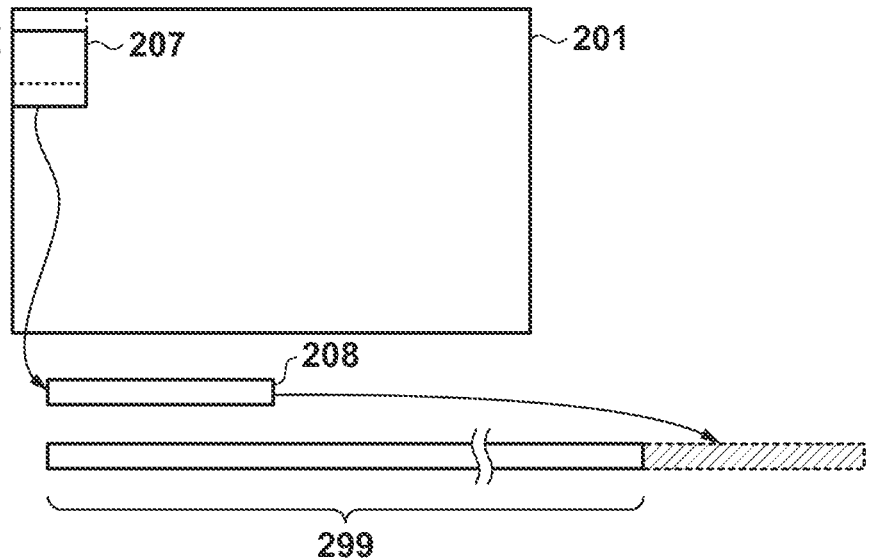

In step S1023, a conversion module 123 converts the two-dimensional pixel array of each setting region set by the setting module 122 into a one-dimensional pixel array (conversion vector), and generates one connected one-dimensional pixel array based on the one-dimensional pixel array of each setting region. The generation processing of a connected one-dimensional pixel array performed by the conversion module 123 will be described with reference to the schematic views of FIGS. 7A to 7C. Note that FIGS. 7A to 7C are views for explaining the one-dimensional pixel array and the connected one-dimensional pixel array, and do not limit the processing order for obtaining these arrays. That is, if the same conversion result can be obtained ultimately, a processing order different from that shown in FIGS. 7A to 7C may be employed or the same conversion may be implemented by combining different processes instead of employing the processing order shown in FIGS. 7A to 7C.

As shown in FIG. 7A, the conversion module 123 converts the two-dimensional pixel array in a setting region 202, positioned at the top left corner of a face image 201, into a one-dimensional pixel array 203. For example, assume that elements of the leftmost column in the two-dimensional pixel array in the setting region 202 are denoted sequentially from above as a1, a2, and a3, elements of the second column from the leftmost column are denoted sequentially from above as a4, a5, and a6, and elements of the rightmost column are denoted sequentially from above as a7, a8, and a9. In this case, the one-dimensional pixel array 203 to be generated from such a two-dimensional pixel array will be [a1, a2, a3, a4, a5, a6, a7, a8, and a9].

Next, as shown in FIG. 7B, the two-dimensional pixel array in a setting region 204, obtained by shifting the setting region 202 to the right by one pixel, is converted into a one-dimensional pixel 205 array by the conversion module 123. As described above, since an overlapping region is present between the adjacent setting regions 202 and 204, a portion overlapping the one-dimensional pixel array 203 corresponding to the setting region 204 will be generated as a result in the one-dimensional pixel array 205 corresponding to the setting region 204. Therefore, the conversion module 123 will acquire, from the one-dimensional pixel array 205, a portion 290 (a region indicated by slanted lines in FIG. 7B) which does not overlap the one-dimensional pixel array 203 in the one-dimensional pixel array 205. Subsequently, the conversion module 123 will generate a connected one-dimensional pixel array 299 obtained by connecting the acquired portion 290 to the right of the one-dimensional pixel array 203. That is, this connected one-dimensional pixel array shares the elements belonging to a region where the setting regions overlap.

In this manner, in the one-dimensional pixel array corresponding to a setting region A obtained by shifting the setting region 202 to the right by N (N is an integer equal to or more than 2), a portion which does not overlap the one-dimensional pixel array corresponding to a setting region B (a setting region obtained by shifting the setting region 202 to the right by (N−1) pixels) adjacent to the setting region A on the left is set as the connection target, and the connection target is connected to the right of the connected one-dimensional pixel array. In this case, if the setting region A is the rightmost setting region of the face image and the connection target of the setting region A is connected to the connected one-dimensional pixel array, the two-dimensional pixel array in a setting region 207 obtained by shifting the setting region 202 below by one pixel is converted into a one-dimensional pixel array 208 as shown in FIG. 7C. Although the setting region 202 and the setting region 207 have a region that overlaps each other here, the overlapping portion will be held redundantly so that the elements of the connected one-dimensional pixel array can be continuously accessed in the subsequent processing. That is, as shown in FIG. 7C, the conversion module 123 connects the one-dimensional pixel array 208 to the right of the connected one-dimensional pixel array 299 at this point. Subsequently, in the same manner, in a one-dimensional pixel array corresponding to the setting region A obtained by shifting the setting region 207 to the right by N pixels, a portion which does not overlap the one-dimensional pixel array corresponding to the setting region B adjacent to the setting region A on the left is set as the connection target, and the connection target is connected to the right of the connected one-dimensional pixel array. Subsequently, in this manner, a connected one-dimensional pixel array is generated by connecting all or some of the one-dimensional pixel arrays corresponding to the respective setting regions. In this manner, in this embodiment, from the one-dimensional pixel array of each succeeding region succeeding a region on one end of a region of interest column arranged in a first direction in a two-dimensional image, a portion that does not overlap the one-dimensional pixel array of a region adjacent to the succeeding region on the side of the region on one end of the region of interest column is obtained. Subsequently, a connected one-dimensional pixel array is generated by connecting the obtained portion and the one-dimensional pixel array corresponding to the region on one end.

Returning to FIG. 6, next, in step S1024, an acquisition module 124 loads, to the RAM 13, a weight coefficient matrix (weight coefficient group) stored in the secondary storage device 14. In this embodiment, a weight coefficient matrix having a size of nine rows (the number of pixels in a setting region=3×3) and three columns (the number of output channels) and whose elements are weight coefficients will be loaded from the secondary storage device 14 to the RAM 13.

Figure 8:
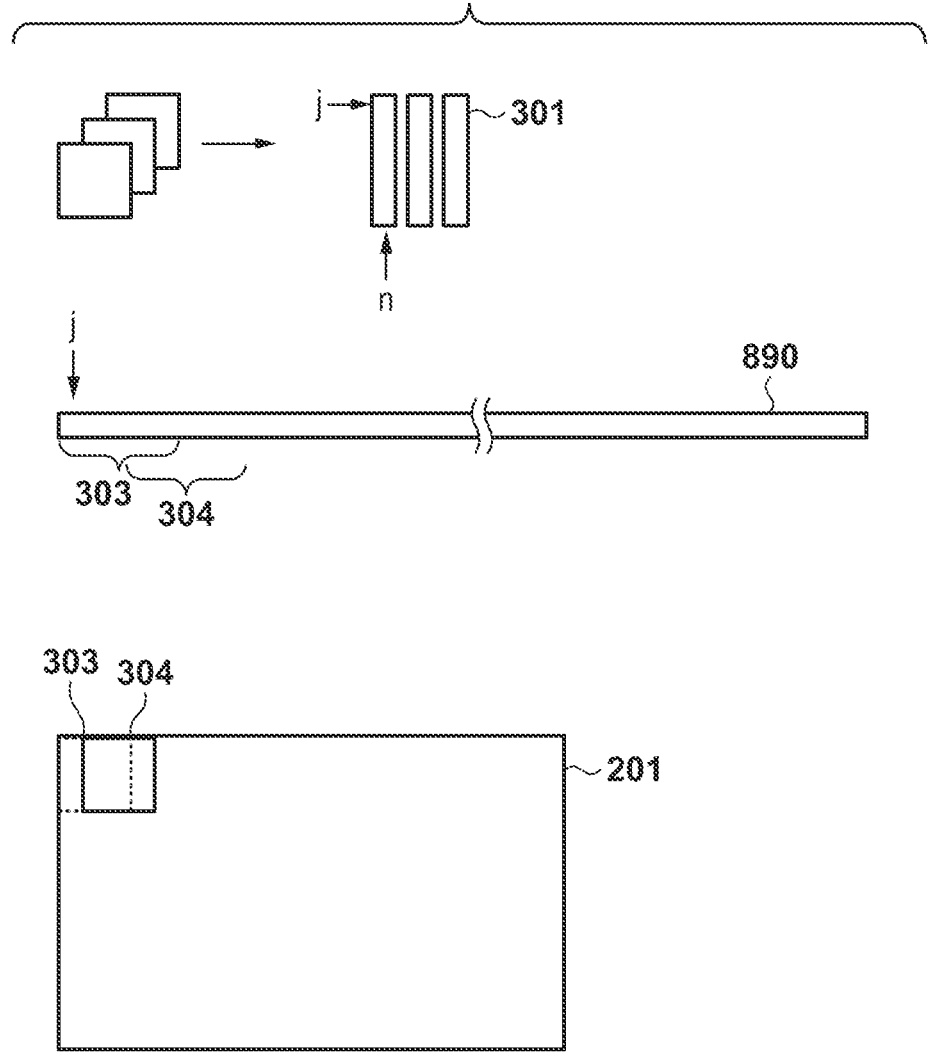
FIG. 8 is a view schematically showing convolution processing performed by an arithmetic operation module 125.

In step S1025, an arithmetic operation module 125 performs convolution processing by using the connected one-dimensional pixel array and the weight coefficient matrix. Letting I be the connected one-dimensional pixel array, F be weight coefficient matrix, and D be an output vector, the arithmetic operation module 125 will perform the arithmetic operation processing according to $$D(i,n)=\Sigma F(j,n)I(i-j) \quad (1)$$

where $\Sigma$ represents that $F(j,n)I(i-j)$ will be added to all j, i represents an output vector index, n represents an output vector and a weight coefficient channel, and j is a weight coefficient index. FIG. 8 is a view schematically showing the convolution processing by the arithmetic operation module 125.

As shown in FIG. 8, the row component and the column component of a weight coefficient matrix 301 correspond to a filter size (that is, 3×3) and the output channel n, respectively. It is preferable for each element (weight coefficient) of the weight coefficient matrix 301 to be rearranged in this manner in advance. The convolution processing of a connected one-dimensional pixel array 890 and the weight coefficient matrix 301 is implemented by calculating the sum of matrix products each obtained between the weight coefficient matrix and a reference range by shifting the reference range in the connected one-dimensional pixel array 890 that has been generated for one face image. A reference range 303 in the connected one-dimensional pixel array 890 corresponds to the one-dimensional pixel array of the setting region positioned in the top left corner of the face image 201, and a reference range 304 corresponds to the one-dimensional pixel array of the setting range obtained by shifting, to the right by one pixel, the setting region at the top left corner of the face image 201. The above-described equation (1) is used to calculate the sum of products each obtained between the weight coefficient matrix and a reference range by shifting the reference range in this manner. In other words, vector matrix multiplication is repeatedly performed by shifting the reference range. The memory can be accessed continuously at the time of the convolution by causing the conversion module 123 to rearrange the setting region elements in advance so that the elements will be continuous (generate a connected one-dimensional pixel array) as described above in this manner, and thus speedup can be expected. Note that an activation function or the like may be applied to each element after the convolution processing.

Returning to FIG. 4, next, a pooling processing module 112 executes pooling processing on the result of the convolution processing by the convolution processing module 111. This processing is the processing of a so-called pooling (subsampling) layer, and a known method may be employed. For example, a method described in the following literature can be used.

P. Sermanet, S. Chintala, and Y. LeCun. Convolutional neural networks applied to house numbers digit classification. In International Conference on Pattern Recognition (ICPR 2012), 2012.

A convolution processing module 113 has the same arrangement (FIG. 5) as the convolution processing module 111 and performs the same processing as the convolution processing module 111 on the result obtained by the pooling processing module 112. Since the convolution processing performed by the convolution processing module 113 is the same as that performed by the convolution processing module 111 other than in the fact that different input size and weight coefficient are used, a description related to the convolution processing module 113 will be omitted. A pooling processing module 114 executes the same pooling processing as the pooling processing module 112 on the result of the convolution processing by the convolution processing module 113.

A full connection processing module 115 performs so-called fully connected (Fullconnect) layer processing. More specifically, the full connection processing module 115 performs a vector matrix multiplication operation of multiplying an input vector (the result of the pooling processing by the pooling processing module 114) by the weight coefficient matrix and outputs the arithmetic operation result (vector) as feature amount of the face image.

Returning to FIG. 3, next, in step S1015, a similarity calculation module 105 loads the registration dictionary stored in the secondary storage device 14 to the RAM 13. A description of the registration dictionary will be given here. A plurality of sets, each set including the feature amount obtained by the feature extraction module 103 from a face image and the identification information of a person (for example, a number or name corresponding to the person) corresponding to the feature amount, are registered in the registration dictionary. In the registration function (to be described later), the user will use the input device 17 to input the identification information of the person corresponding to the feature amount obtained by the feature extraction module 103 from a face image, and an acquisition module 108 will acquire the input identification information. Subsequently, a dictionary registration module 104 will create a set of a feature amount, which is obtained by the feature extraction module 103 from the face image, and identification information, which is related to the feature amount that has been acquired by the acquisition module 108, and will register the set of the feature amount and the identification information in the registration dictionary. Note that the registration dictionary may include a set corresponding to each person of a plurality of people or may include a plurality of sets for one person.

In step S1016, the similarity calculation module 105 obtains the similarity between the feature amount obtained by the feature extraction module 103 from the face image in step S1014 and each feature amount included in the registration dictionary loaded to the RAM 13 in step S1015. There are various kinds of methods for obtaining the similarity between feature amounts, and any method can be employed. For example, a cosine similarity S between feature amounts can be obtained by using $$S = \cos\theta = x \cdot y / |x||y| \quad (2)$$

where "x·y" represents an inner product operation of a feature vector (feature amount) x and a feature vector (feature amount) y, |x| and |y| represent the size of the feature vector x and the size of the feature vector y, respectively, and S represents the similarity between the feature vector x and the feature vector y.

In step S1017, a determination module 106 determines, based on the similarity obtained by the similarity calculation module 105, which person is (or is not), among the people whose feature amounts are registered in the registration dictionary, the person corresponding to the feature amount obtained by the feature extraction module 103 in step S1014. For example, the determination module 106 specifies the maximum similarity among the similarities obtained by the similarity calculation module 105 for the respective feature amounts registered in the registration dictionary. If the specified maximum similarity is equal to or more than a threshold, the determination module 106 acquires the identification information registered in the registration dictionary that has been registered as a set with the feature amount from which the maximum similarity was obtained. For example, in a case in which the similarity between the feature amount obtained in step S1014 and a feature amount A registered in the registration dictionary corresponds to the above-described maximum similarity, the determination module 106 will determine that the feature amount obtained in step S1014 is the feature amount of a person corresponding to the feature amount A. Thus, in this case, the determination module 106 will read out the identification information that forms the set with the setting region A as the identification information of the person corresponding to the feature amount obtained in step S1014.

On the other hand, if the specified maximum similarity is less than the threshold, the determination module 106 will determine that the feature amount obtained by the feature extraction module 103 in step S1014 does not match the feature amount of any person whose feature point is registered in the registration dictionary.

Note that in a case in which similarities are obtained for the plurality of feature amounts for the same person in the registration dictionary, the maximum similarity among the obtained similarities will be determined to be the similarity corresponding to the person. The authentication result of the face image is obtained in this manner in step S1017.

In step S1018, a display module 107 causes the external output device 16 to display the authentication result acquired by the determination module 106. For example, if the determination module 106 has acquired the identification information from the registration dictionary, the display module 107 may read out the person information stored in the secondary storage device 14 in association with the identification information and cause the external output device 16 to display the person information. The person information stored in the secondary storage device 14 in association with the identification information is, for example, text information (name, age, sex, and the like) concerning the person or the image of the person corresponding to the identification information. Note that it may be arranged so that the maximum similarity described above will be displayed together with the person information. In addition, if the determination module 106 determines that "the feature amount obtained by the feature extraction module 103 in step S1014 does not match the feature amount of any person whose feature point is registered in the registration dictionary", the display module 107 will cause the external output device 16 to display images and characters indicating this state.

Note that in a case in which the authentication result notification is to be performed by audio, the display module 107 will output a sound corresponding to the authentication result from the external output device 16, and in a case in which the authentication result notification is to be performed by lighting an LED lamp or by causing the LED lamp to light a pattern, the light or the lighting pattern of the LED lamp will be controlled in accordance with the authentication result.

When the processes of steps S1014 to S1018 have been performed for all of the face images detected from the captured image, the process advances to step S1019. In step S1019, the CPU 11 determines whether the user has input a processing end instruction by operating the input device 17. As a result of this determination, if it is determined that the user has input a processing end instruction by operating the input device 17, the processing according to the flowchart of FIG. 3 is completed. On the other hand, if it is determined that the user has not input a processing end instruction by operating the input device 17, the process returns to step S1011.

Note that although the authentication processing has been performed for all of the captured images obtained in step S1011 in the above description, it may be set so that the authentication processing will be performed for some of captured images. For example, the authentication processing may be performed on a captured image every couple of frames or the authentication processing may be performed by clustering the feature amounts extracted from a captured image and using a representative feature amount selected from one cluster.

Figure 4:
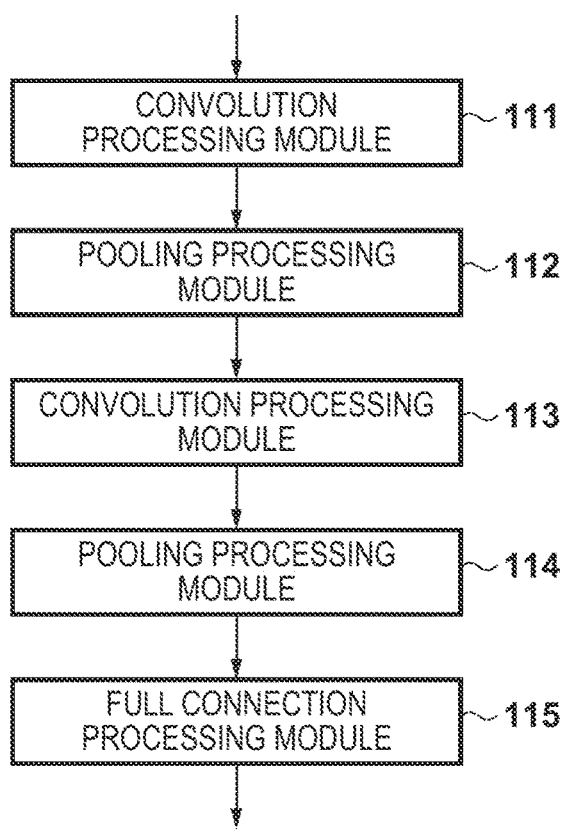
FIG. 4 is a block diagram showing an example of the functional arrangement of a feature extraction module 103.

In addition, although deep neural network processing shown in FIG. 4 was used for feature amount extraction, the deep neural network need not have this arrangement. For example, the number of convolution processing operations may be increased or other processing may be added.

The registration function of the information processing apparatus 1 will be described next. FIG. 9 shows a flowchart corresponding to the registration function. Note that the information processing apparatus 1 has been activated before the start of the processing according to the flowchart of FIG. 9 and is in a state in which the processing to be described below can be started. In addition, assume that the camera 2 has been activated and is in a moving image capturing state as a monitoring camera. In this embodiment, assume that the same camera (camera 2) will be used as the camera to be used at the time of the execution of the registration function and at the time of the execution of the authentication function. Such an arrangement will allow a feature amount, which is based on a captured image obtained under the same image capturing condition (illumination condition, direction of the face, and the like) as the authentication location, to be registered in the registration dictionary, and thus improvement of the authentication accuracy can be expected. Note that it may be arranged so that a camera for dictionary registration will be installed in another location and used at the execution of the registration function. However, since the image capturing conditions will differ from those of the monitoring/authentication location in this case, attention is needed to determine whether the authentication accuracy will be sufficient.

In step S1031, in the same manner as the above-described step S1011, the image acquisition module 101 acquires a captured image received from the camera 2 by the communication device 15 and stored in the RAM 13 and converts the captured image into a single-channel grayscale image. Note that it is preferable to prepare a registration mode for the dictionary registration and acquire an image in accordance with user input.

Next, in step S1032, in the same manner as the above-described step S1012, the face detection module 102 detects the region of an object (the face of a person in this embodiment) from the captured image acquired by the image acquisition module 101 and extracts an image in the detected region as a face image. Note that if a face cannot be detected from the captured image, it is preferable to perform processing to prompt the user to acquire a captured image again.

Next, in step S1033, in the same manner as the above-described step S1014, the feature extraction module 103 extracts a feature amount from the face image by using the CNN that has been generated in advance. Since the user will operate the input device 17 to input the identification information of the person corresponding to the face image here, the acquisition module 108 will acquire the input identification information in step S1034.

Subsequently, in step S1035, the dictionary registration module 104 will register the feature amount extracted in step S1033 and the identification information acquired in step S1034 as a set in the registration dictionary. The registration dictionary is stored in the secondary storage device 14 or the RAM 13.

Second Embodiment

The first embodiment exemplified a case in which a captured image is obtained as a single-channel grayscale image and convolution processing is performed on a face image (single-channel grayscale image) extracted from such a captured image. However, there are many cases in which a captured image which is a multi-channel image such as a color image will be input in practice. This embodiment will describe convolution processing performed on a face image (multi-channel image) that has been detected from a captured image which is a multi-channel image. Differences from the first embodiment will be described hereinafter, and components and arrangements are the same as those of the first embodiment unless particularly mentioned. In this embodiment, the following processing will be executed in accordance with the flowchart of FIG. 6.

In step S1021, an acquisition module 121 acquires a face image as input data. Since the captured image is a multi-channel image in this embodiment, the face image detected from the captured image is also a multi-channel image.

In step S1022, a setting module 122 will set, for each channel image of the face image acquired in step S1021, setting regions two-dimensionally on the channel image so adjacent setting regions will overlap each other in the same manner as in the first embodiment.

Figure 10A:
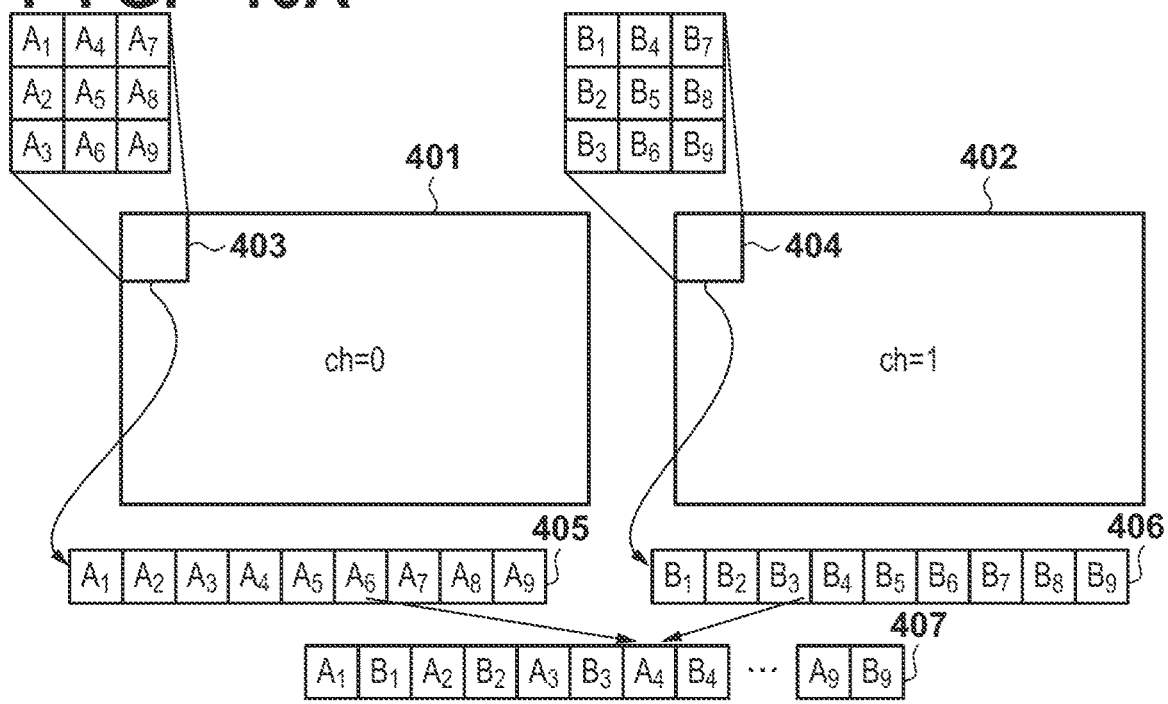
FIGS. 10A and 10B are views for explaining the operation of a conversion module 123.
Figure 10B:
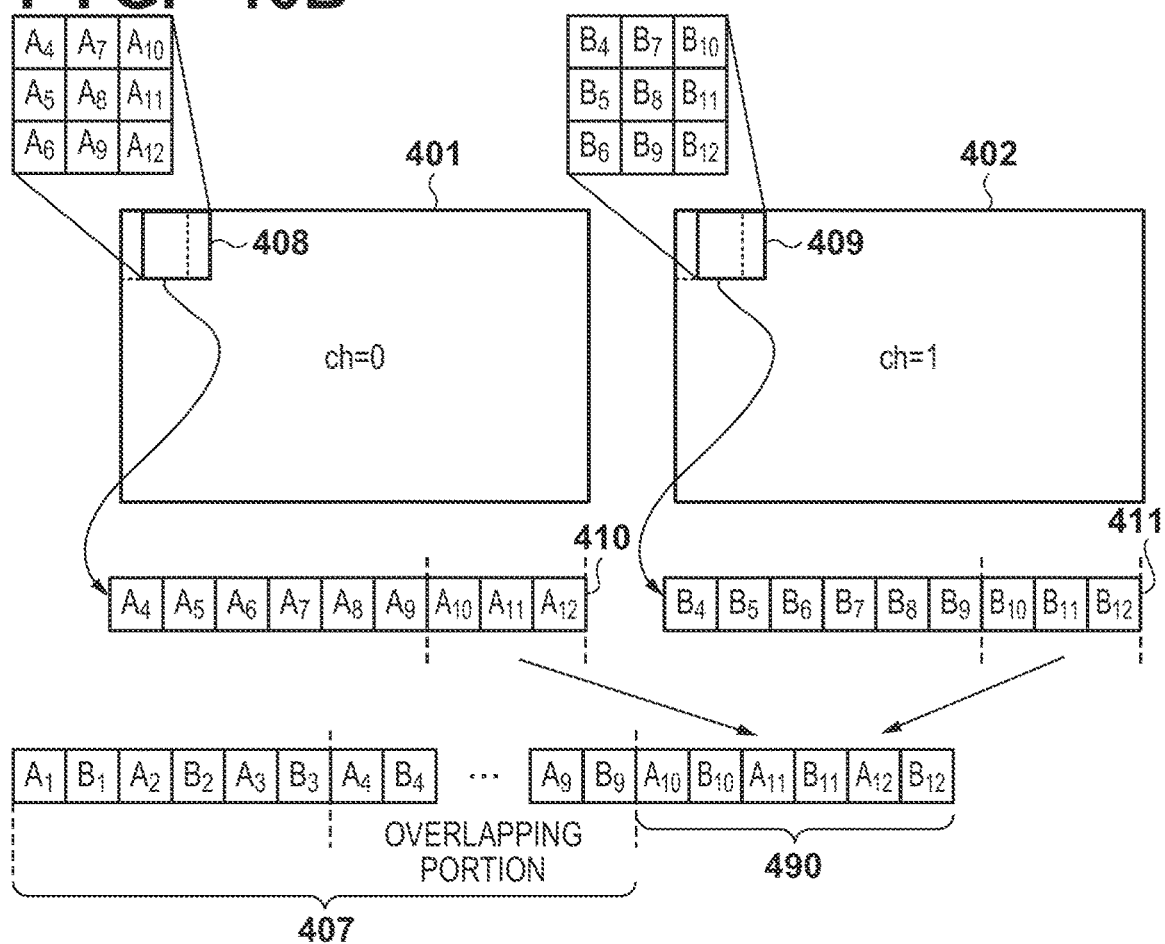

In step S1023, a conversion module 123 will convert a two-dimensional pixel array in each setting region set by the setting module 122 into a one-dimensional pixel array, and generate a single connected one-dimensional pixel array based on the one-dimensional pixel array of each setting region. The operation of the conversion module 123 according to this embodiment will be described with reference to the examples shown in FIGS. 10A and 10B. In FIGS. 10A and 10B, a connected one-dimensional pixel array has been generated from the setting regions of a face image that has two channel images. Note that, as described above, the processing order is not limited to that shown in FIGS. 10A and 10B.

As shown in FIG. 10A, the conversion module 123 converts the two-dimensional pixel array in a setting region 403 at the top left corner of a first channel image (a channel image of ch=0) 401 of the face image into a one-dimensional pixel array 405. Reference symbols A1 to A9 denote the pixel values of the respective pixels forming the two-dimensional pixel array in the setting region 403. The conversion module 123 also converts the two-dimensional pixel array, in a setting region 404 at the top left corner of a second channel image (a channel image of ch=1) 402 of the face image, into a one-dimensional pixel array 406. Reference symbols B1 to B9 denote the pixel values of the respective pixels forming the two-dimensional pixel array in the setting region 404. The conversion module 123 then generates a connected one-dimensional pixel array 407 integrating the one-dimensional pixel array 405 and the one-dimensional pixel array 406. As shown in FIG. 10A, the connected one-dimensional pixel array 407 is an array in which the elements forming the one-dimensional pixel array 405 and the elements forming the one-dimensional pixel array 406 are arranged alternately, and has, as a result, an arrangement of A1, B1, A2, B2, . . . , A9, B9. This arrangement is an arrangement in which the channels will be continuous.

Next, as shown in FIG. 10B, the conversion module 123 converts the two-dimensional pixel array in a setting region 408 obtained by shifting the setting region 403 to the right by one pixel in the first channel image 401 into a one-dimensional pixel array 410. Reference symbols A4 to A12 denote the pixel values of the respective pixels forming the two-dimensional pixel array in the setting region 408. The conversion module 123 also converts, as shown in FIG. 10B, the two-dimensional pixel array in a setting region 409 obtained by shifting the setting region 404 to the right by one pixel in the second channel image 402 into a one-dimensional pixel array 411. Reference symbols B4 to B12 denote the pixel values of the respective pixels forming the two-dimensional pixel array in the setting region 409. The conversion module 123 then generates a portion 490 in which the elements (A10 to A12) that do not overlap the one-dimensional pixel array 405 in the one-dimensional pixel array 410 and the elements (B10 to B12) that do not overlap the one-dimensional pixel array 406 in the one-dimensional pixel array 411 are alternately arranged. The portion 490 will have an arrangement of A10, B10, A11, B11, A12, and B12. Next, the conversion module 123 will connect the generated portion 490 to the right of the connected one-dimensional pixel array 407. That is, this connected one-dimensional pixel array shares the elements belonging to a region where the setting regions overlap. Subsequently, the same processing will be performed until the rightmost setting region, and upon completion of the processing of the rightmost setting region, two-dimensional pixel arrays in setting regions each obtained by shifting one of the setting regions 403 and 404 by one pixel below will be converted into one-dimensional pixel arrays in the same manner as in the first embodiment. The elements of the one-dimensional pixel arrays will be alternately arranged and connected into a connected one-dimensional pixel array. The same processes as described above will be performed hereinafter.

In this manner, by generating a connected one-dimensional pixel array so as to create a continuous channel, the arrangement of the elements of the one-dimensional pixel array corresponding to each setting region will become continuous. To describe this in more general terms, a connected one-dimensional pixel array is generated so that a dimension other than the dimension of the arrangement positions (the horizontal direction and the vertical direction of the face image in this embodiment) of each setting region will be continuous. This will allow subsequent processes to be processed by a convolution in the same manner as the first embodiment. For example, if the one-dimensional pixel array 405 and the one-dimensional pixel array 406 are connected as they are, the elements belonging to the next setting region excluding the overlapping portion will be discontinuous, and the convolution processing will not be able to be performed.

Returning to FIG. 6, the following processes of steps S1024 and S1025 are the same as those of the first embodiment. Note that although the captured image (face image) has been described as including two channel images in this embodiment, the number of channels of the captured image (face image) is not limited to two. However, the generation method of the connected one-dimensional pixel array is the same as that described above even in this case. For example, assume that the number of channels of the captured image (face image) is CH (an integer equal to or more than 3). That is, it is assumed that a captured image will include a channel image of channel number ch=1, a channel image of channel number ch=2, . . . , and a channel image of channel number ch=CH. In this case, the connection target is an array that has been obtained by connecting an element array in which an Nth element from the leftmost end of an one-dimensional pixel array of each channel image has been arranged in a channel image order, an element array in which each (N+1)th element from the leftmost end has been arranged in the channel image order, . . . , and an element array in which each rightmost end element has been arranged in the channel image order. A channel image order points to an ascending order of ch. Here, the "Nth element" (an identical position element) is N=1 in the case of a leftmost setting region, and N (N=10 in the case of FIG. 10B) corresponding to the first element of the connection target in the case of a setting region other than the leftmost setting region.

Third Embodiment

The first and second embodiments have described convolution processing performed on a two-dimensional image. However, the embodiments described above can be applied to convolution processing performed on a larger dimensional input. For example, the following literature discloses convolution processing performed on three-dimensional input data, and the above-described embodiments can be applied to this example.

D. Tran, L. Bourdev, R. Fergus, L. Torresani, and M. Paluri. Learning spatiotemporal features with 3D convolutional networks. In ICCV, 2015.

Differences from the first embodiment will be described hereinafter, and components and arrangements are the same as those of the first embodiment unless particularly mentioned. This embodiment will describe a case in which a feature amount of a time-series sequence (a three-dimensional object obtained by stacking the face images of a plurality of frames) of faces images (grayscale images) detected from the respective captured images of a plurality of frames that have captured a single face is obtained. In this embodiment, the following processing will be executed in accordance with the flowchart of FIG. 6.

In step S1021, an acquisition module 121 acquires a time series sequence (a three-dimensional object obtained by stacking the face images of a plurality of frames) of face images. In step S1022, the setting module 122 sets setting regions three-dimensionally in the three-dimensional object so that adjacent setting regions (three-dimensional regions in this embodiment) will partially overlap each other. In step S1023, a conversion module 123 converts the three-dimensional pixel array in each setting region set by a setting module 122 into a two-dimensional pixel array and generates a single connected two-dimensional pixel array based on the two-dimensional pixel arrays of the respective setting regions. The operation of the conversion module 123 according to this embodiment will be described with reference to the examples shown in FIG. 11A to 11D. Note that the processing order is not limited to that shown in FIGS. 11A to 11D.

Figure 11A:
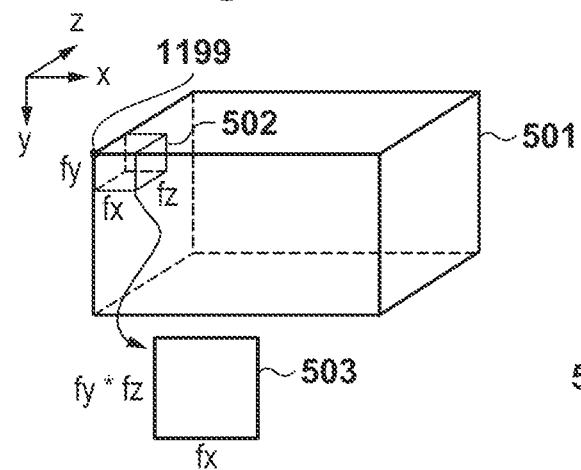
FIGS. 11A to 11D are views for explaining the operation of a conversion module 123.

In FIG. 11A, a three-dimensional object 501 is a three-dimensional object obtained by stacking the face images. An x-direction corresponds to the horizontal direction, a y-direction corresponds to a vertical direction in of the face images, and a z-direction corresponds to the stacking direction (that is, the time (frame) direction) of the face images.

As shown in FIG. 11A, the conversion module 123 converts the three-dimensional pixel array in a setting region 502 whose position at the top left corner at the front side is at a position 1199 at the top left corner on the front side of the three-dimensional object 501 into a two-dimensional pixel array 503. In FIG. 11A, reference symbols fx, fy, and fz denote the size in the x direction, the size in the y direction, and the size in the z direction, respectively, of the setting region 502. The two-dimensional pixel array 503 is an array obtained by arranging partial images included in the setting region 502 from top to bottom in the order of the frames, and a reference symbol fx denotes the size in the horizontal direction, and reference symbol fy×fz denotes the size in the vertical direction. In this manner, three-dimensional data (three-dimensional pixel array) is converted into two-dimensional data (two-dimensional pixel array) by combining the y-axis and the x-axis.

Figure 11B:
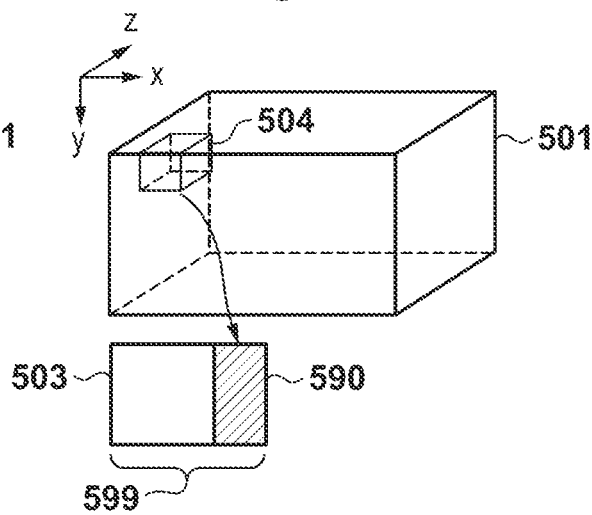

Next, as shown in FIG. 11B, the conversion module 123 converts the three-dimensional pixel array in a setting region 504 obtained by shifting the setting region 502 in the x-axis direction (a direction perpendicular to the z direction) by one pixel into a two-dimensional pixel array. As described above, since there is an overlapping region between the setting region 502 and the two-dimensional pixel array 503 which are adjacent to each other, an overlapping portion will be generated as a result between the two-dimensional pixel array corresponding to the setting region 504 and the two-dimensional pixel array 503 corresponding to the setting region 502. Hence, the conversion module 123 will acquire, from the two-dimensional pixel array corresponding to the setting region 504, a portion 590 (a region indicated by slanted lines in FIG. 11B) which does not overlap the two-dimensional pixel array 503 in the two-dimensional pixel array corresponding to the setting region 504. Subsequently, the conversion module 123 will generate a connected two-dimensional pixel array 599 obtained by connecting the acquired portion 590 to the right of the two-dimensional pixel array 503. That is, this connected two-dimensional pixel array shares the elements belonging to a region where the setting regions overlap. Subsequently, the conversion module 123 updates the connected two-dimensional pixel array by performing the same processing on a setting region obtained by shifting the setting region 504 in the x direction.

Figure 11C:
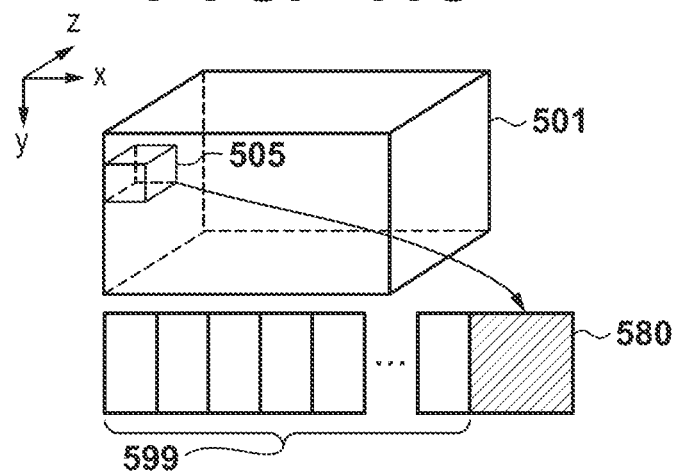

Next, assume that a setting region obtained by shifting the setting region 502 in the x direction has reached the rightmost end of the three-dimensional object 501, and the connection target of the rightmost setting region has been connected to the connected two-dimensional pixel array. Then, as shown in FIG. 11C, the three-dimensional pixel array in a setting region 505 obtained by shifting the setting region 502 in the y direction by one pixel is converted into a two-dimensional pixel array 580. As shown in FIG. 11C, the conversion module 123 connects the two-dimensional pixel array 580 to the right of the connected two-dimensional pixel array 599 at this point. Subsequently, the same processing is performed until the connection target of the setting region at the bottom right corner on the front side of the three-dimensional object 501 is connected to the connected two-dimensional pixel array.

Figure 11D:
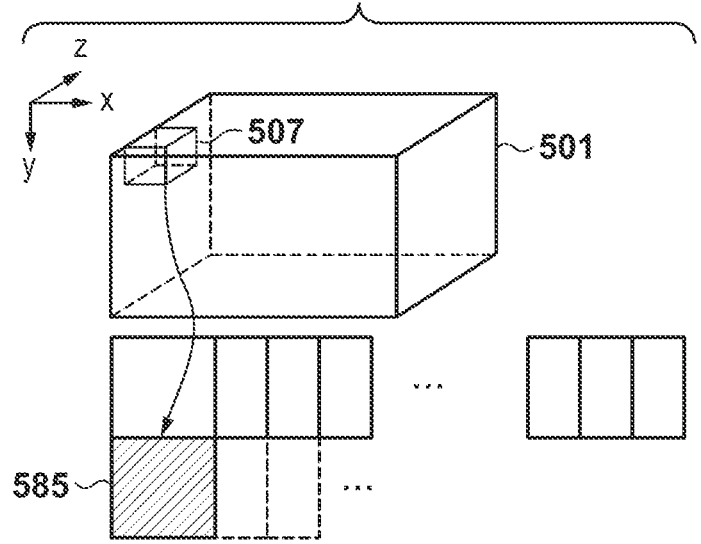

When every setting region on the front side of the three-dimensional object 501 has been connected to the connected two-dimensional pixel array, a two-dimensional pixel array 585 of a setting region 507 obtained by shifting the setting region 502 in the z direction by one pixel is obtained as shown in FIG. 11D. The conversion module 123 will then connect the obtained two-dimensional pixel array 585 to the foot and the leftmost end of the connected two-dimensional pixel array. Subsequently, as described above, the connected two-dimensional pixel array is generated by sequentially connecting the connection target of each setting region which has the same z-direction position (z position) but different x-direction position (x position) and y-direction position (y position) to the right of the two-dimensional pixel array 585.

In this manner, the connected two-dimensional pixel array generated in this embodiment is an array in which "connected two-dimensional pixel arrays, each obtained by connecting the two-dimensional pixel arrays or the connection targets of setting regions in the same z position" are arranged from top to bottom (or from bottom to top) in the z-position order.

Figure 12:
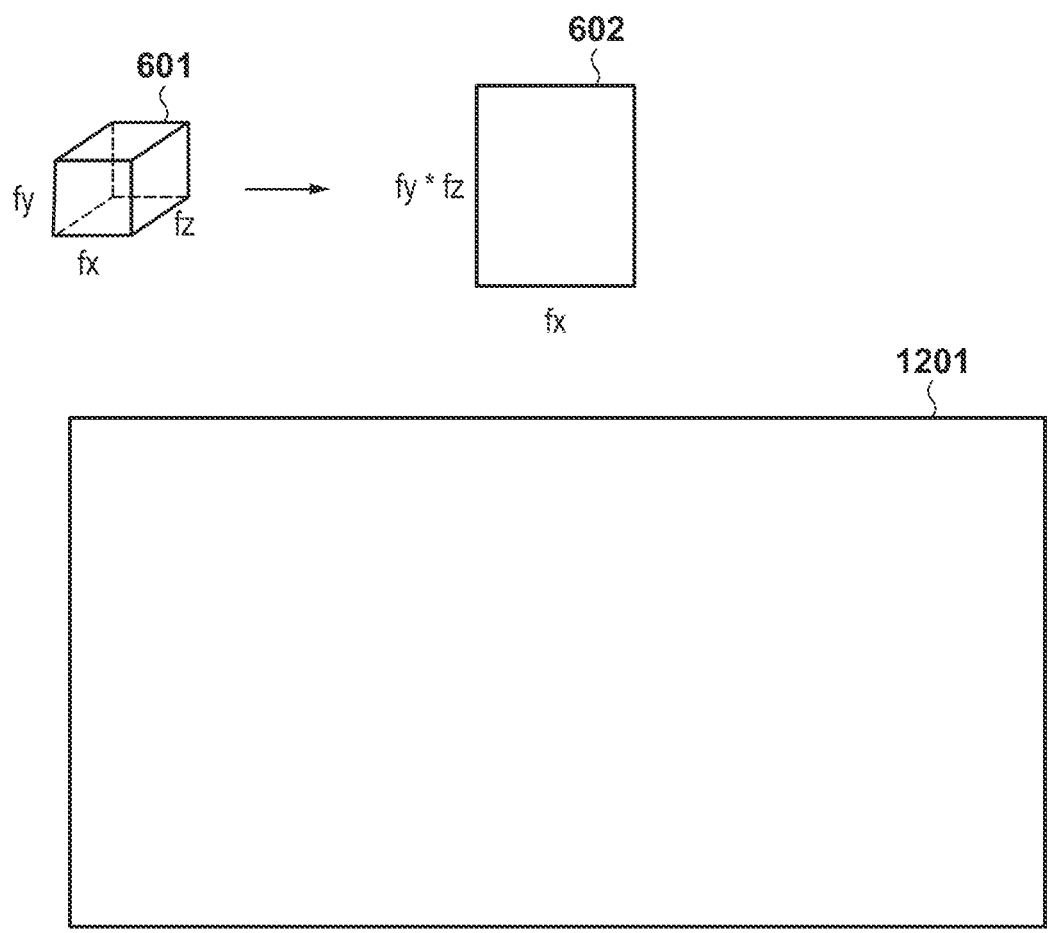
FIG. 12 is a view schematically showing convolution processing performed by an arithmetic operation module 125.

Returning to FIG. 6, next, in step S1024, an acquisition module 124 loads a three-dimensional weight coefficient matrix (weight coefficient group) stored in a secondary storage device 14 into a RAM 13. Next, in step S1025, an arithmetic operation module 125 executes convolution processing by using the connected two-dimensional pixel array and the three-dimensional weight coefficient matrix. FIG. 12 is a view schematically showing the convolution processing performed by the arithmetic operation module 125.

Reference symbols fx, fy, and fz denote a size in the x direction, a size in the y direction, and a size in the z direction, respectively, of a three-dimensional weight coefficient matrix 601. A two-dimensional weight coefficient matrix 602 is a weight coefficient matrix obtained by connecting, in the vertical direction, two-dimensional weight matrices corresponding to respective z positions in the three-dimensional weight coefficient matrix 601, and a reference symbol fx denotes the size in the horizontal direction and reference symbol fy×fz denotes the size in the vertical direction. The two-dimensional weight coefficient matrix 602 converts three-dimensional data into two-dimensional data by combining the x-axis and the y-axis in the same manner as described above. A three-dimensional convolution is implemented by performing convolution processing of the two-dimensional weight coefficient matrix 602 and a connected two-dimensional pixel array 1201. That is, a calculation is performed so that the convolution of three-dimensional data will result in the convolution of two-dimensional data. To describe this in more general terms, a calculation is performed so that a higher dimensional data convolution will result in a lower dimensional data convolution. This convolution of two-dimensional data can be performed by using the method described in the first embodiment.

Subsequently, the above-described feature amount of the three-dimensional object is obtained by performing the above-described pooling processing and the same kind of three-dimensional convolution processing as the above-described three-dimensional convolution processing on this convolution processing. The subsequent processing is the same as that in the first embodiment.

Fourth Embodiment

The first to third embodiments used several schematic views and procedures to describe the shapes of transformation vectors (the one-dimensional pixel array and the two-dimensional pixel array). However, the processing need not always be performed in these ways. Since it will ultimately result in the convolution of a lower dimension vector and the weight coefficients, it is sufficient for the converted vector to have a structure in which elements belonging to an overlapping portion of setting regions are shared as described above.

The first to third embodiments described a case in which the dimensionality of the input data is two or three. However, whatever the dimensionality of the input data is, any set of input data will result in the following structure. That is, an element array in each region set so as to partially overlap in adjacent regions in a plane or a space defined by the input data is converted into a lower dimension element array as an element array of a lower dimension. Subsequently, a connected element is generated by connecting all or some of the lower dimension element arrays so that the overlapping portions will be shared in the converted lower dimension element arrays, and the feature amount of the input data is obtained based on the convolution of the connected elements and the weight coefficients. Note that it may be set so that at least one set of adjacent regions will partially overlap each other.

In addition, if there are a plurality of input data items, the processing of the embodiments described above can be applied to each of the plurality of input data items or a calculation can be performed by connecting the transformation vectors generated for the plurality of input data items and performing the convolution once. In such a case, since the portion of the convolution over the plurality of input data items is wasteful as processing when convolving the weight coefficients to the transformation vector, the calculation needs to be skipped or only effective elements needs to be extracted by executing rearrangement or the like.

Furthermore, although an example in which deep neural network processing that includes convolution processing is performed for facial authentication was described above, the purpose of the feature amount obtainment processing described above is not limited to facial authentication. For example, the feature amount calculation processing described in the first to third embodiments may be applied to an image recognition operation other than facial authentication or to convolution which is not deep neural network processing, for example, simple image filter processing or the like.

Fifth Embodiment

The camera 2 and the information processing apparatus 1 were described as separate apparatuses in the embodiments described above. However, the camera 2 and the information processing apparatus 1 may be integrated into a single apparatus. That is, the camera 2 may be formed so as to execute the functions described above as the functions of the information processing apparatus 1.

In addition, in the above-described embodiments, a result, such as an authentication result, of processing performed by using feature amounts were notified to a user by display, audio output, lighting an LED lamp, and causing the LED lamp to light a pattern, but the notification methods are not limited to these. For example, the notification may be performed by transmitting an email to a specific notification destination.

In the above-described embodiments, the functions of the information processing apparatus 1 were implemented by a CPU 11 executing computer programs. However, the same functions may be implemented by using hardware. For example, some or all of the functional modules shown in FIG. 2 may be implemented by hardware. A dedicated circuit (ASIC), a processor (a reconfigurable processor, a DSP, or the like), and the like may be used as the hardware. In addition, the same functions may be implemented by using a GPU. Furthermore, it may be arranged so that each computer program described above will be read out from a storage medium such as a CD-ROM, a DVD-ROM, or the like or acquired by receiving the computer program from the outside via a network, and the acquired computer program will be executed by the CPU 11.

Also, one camera transmitted a captured image to the information processing apparatus 1 in the above-described embodiments. However, the present invention is not limited to this, and a plurality of cameras may be used. In addition, although the above-described embodiments exemplified a case in which the information processing apparatus 1 acquired the captured image from the camera 2, the acquisition method of the captured image is not limited to a specific acquisition method. For example, it may be arranged so that the information processing apparatus 1 will acquire, from a server apparatus, captured images which have been obtained in advance and stored in the server apparatus.

In addition, although a feature amount was extracted from an entire face image in the above-described embodiments, it may be set so that the feature amount will be extracted from a partial region of a face image. For example, the feature amount may be extracted from a partial region set by using a specific facial organ (such as eyes, a nose, or the like) as a reference. A known technique (for example, a method disclosed in Japanese Patent Laid-Open No. 2009-211177) may be used as the method of detecting the position of the organ in the face image. Furthermore, dimensional compression and quantization of the extracted feature amount may be performed.

In addition, the above-described embodiments described an example in which authentication was executed for every face image detected from a captured image. However, it may be set so that the authentication processing will be performed on only a specific face image among the face images of the captured image. That is, it may be set so that the processes of steps S1014 to S1018 described above will be performed only on a specific face image. A specific face image is a face image that satisfies specific conditions, for example, a face image of a size equal to or more than a predetermined size, a face image whose occupation ratio in the captured image is equal to or more than a predetermined value, a face image selected by the user on the captured image, or the like.

In addition, although the information processing apparatus 1 was described as having both the authentication function and the registration function in the above-described embodiments, it may be separated into an apparatus for executing the authentication function and an apparatus for executing the registration function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-077796, filed Apr. 13, 2018, which is hereby incorporated by reference herein in its entirety.

What is claimed is:

1. An information processing apparatus comprising:
    a conversion unit configured to convert an element array, in each region set so as to partially overlap at least one set of adjacent regions in input data, into a lower dimension element array of which dimension is lower than that of the element array;
    a generation unit configured to generate a connected element by connecting some or all of the lower dimension element arrays converted by the conversion unit so that an overlapping portion in each of the lower dimension element arrays will be shared; and
    a calculation unit configured to obtain a feature amount of the input data based on convolution of the connected elements and a weight coefficient.

2. The apparatus according to claim 1, wherein the input data is a two-dimensional image and the lower dimension element array is a one-dimensional pixel array.

3. The apparatus according to claim 2, wherein the conversion unit converts, into a one-dimensional pixel array, a two-dimensional pixel array in each region two-dimensionally set on the two-dimensional image so that adjacent regions will partially overlap each other.

4. The apparatus according to claim 3, wherein the generation unit acquires, from a one-dimensional pixel array of each succeeding region succeeding a region on one end of a region of interest column arranged in a first direction in the two-dimensional image, a portion which does not overlap a one-dimensional pixel array of a region adjacent to the succeeding region on the side of the region on one end of the region of interest column, and the generation unit generates a connected one-dimensional pixel array by connecting the portion and a one-dimensional pixel array corresponding to the region on one end.

5. The apparatus according to claim 4, wherein the calculation unit obtains the feature amount of the two-dimensional image based on the convolution of the connected one-dimensional pixel array and the weight coefficient.

6. The apparatus according to claim 2, wherein the two-dimensional image is each channel image in a multi-channel image.

7. The apparatus according to claim 6, wherein the generation unit generates a connected one-dimensional pixel array by connecting an element array obtained by arranging, in a channel image order, elements at identical positions in the one-dimensional pixel arrays corresponding to the regions on one end in the respective channel images and an element array obtained by arranging, in the channel image order, elements at identical positions in the portions corresponding to the respective channel images.

8. The apparatus according to claim 2, wherein the calculation unit performs first pooling processing on the result of the convolution of the connected one-dimensional pixel array and the weight coefficient.

9. The apparatus according to claim 8, wherein the calculation unit performs second convolution and second pooling processing on a result of the first pooling processing.

10. The apparatus according to claim 9, wherein the calculation unit obtains the feature amount by performing full connection processing on a result of the second pooling processing.

11. The apparatus according to claim 2, wherein the two-dimensional image is an image of a human face.

12. The apparatus according to claim 1, wherein the input data is a three-dimensional object obtained by stacking a plurality of two-dimensional images.

13. The apparatus according to claim 12, wherein the conversion unit converts a three-dimensional pixel array in each region set in the three-dimensional object so that adjacent regions will partially overlap each other into a two-dimensional pixel array.

14. The apparatus according to claim 13, wherein the generation unit acquires, from a two-dimensional pixel array of a succeeding region succeeding a region on one end of a region of interest column arranged in a first direction perpendicular to a stacking direction of the three-dimensional object, a portion which does not overlap a two-dimensional pixel array of a region adjacent to the succeeding region on the side of the region on one end of the region of interest column, and the generation unit generates a connected two-dimensional pixel array by connecting the portion and a two-dimensional pixel array corresponding to the region on the region on one end.

15. The apparatus according to claim 14, wherein the calculation unit obtains the feature amount of the three-dimensional object based on the convolution of the connected two-dimensional pixel array and the weight coefficient.

16. The apparatus according to claim 1, further comprising:
    a registration unit configured to register the feature amount and information related to an object input by a user in a registration dictionary.

17. The apparatus according to claim 16, further comprising:
    an authentication unit configured to authenticate the input data based on the similarity between the feature amount obtained by the calculation unit and the feature amount registered in the registration dictionary.

18. The apparatus according to claim 17, further comprising:
    an output unit configured to output a result of the authentication by the authentication unit.

19. An information processing method performed by an information processing apparatus, the method comprising:
    converting an element array, in each region set so as to partially overlap at least one set of adjacent regions in input data, into a lower dimension element array of which dimension is lower than that of the element array;

generating a connected element by connecting some or all of the lower dimension element arrays converted in the converting so that an overlapping portion in each of the lower dimension element arrays will be shared; and obtaining a feature amount of the input data based on convolution of the connected elements and a weight coefficient.

20. A non-transitory computer-readable storage medium storing a computer program for causing a computer to function as a conversion unit configured to convert an element array, in each region set so as to partially overlap at least one set of adjacent regions in input data, into a lower dimension element array of which dimension is lower than that of the element array of a lower dimension;

a generation unit configured to generate a connected element by connecting some or all of the lower dimension element arrays converted by the conversion unit so that an overlapping portion in each of the lower dimension element arrays will be shared; and a calculation unit configured to obtain a feature amount of the input data based on convolution of the connected elements and a weight coefficient.

* * * * *